Patented Dec. 19, 1950

2,534,541

UNITED STATES PATENT OFFICE 2,534,541

FRACTIONATION OF TYROTHRICIN

Abraham L. Baron, New York, N. Y., assignor to S. B. Penick & Company, New York, N. Y., a corporation of Delaware No Drawing. Application February 28, 1948, Serial No. 14,401

10 Claims. (Cl. 167—65)

My invention relates to the production of major components of tyrothricin, and it has for its general object an improvement in the fractionation of tyrothricin into major components. Primarily, these components are gramicidin and tyrocidine.

It is an object of my invention to provide an improved fractionating method whereby the major components of tyrothricin are produced in high yields and purity and in a more simple, rapid, and technically feasible manner than heretofore. The fractionating procedure will be most effective only if it fulfills all of these objectives.

It is an object of my invention to simplify and improve the fractionating procedure so as to obtain more complete fractionation and high yields of pure gramicidin and tyrocidine. These compounds have well-recognized biological qualities, and a major object of my invention is to make them more readily available to the medical art and to supply them in a highly purified form in which they can be readily assayed and standardized and embodied in medical preparations of the highest quality.

Tyrothricin is a well-known antibiotic agent. It has been found useful in the treatment of disease caused by infection with certain Gram-positive bacteria, particularly those of the Streptococcus and Staphylococcus groups. It has been employed successfully in veterinary medicine in the treatment of bovine mestitis, and is known to kill bovine sperm. It is beneficial as stabilizer for tetanus stock solutions, and for the isolation of *Hemophilus influenzae* and *Neisseria gonorrheae* when added to culture media.

Tyrothricin is produced by the action of a spore-forming, Gram-negative bacillus such as *Bacillus brevis*. R. J. Dubos, Studies on a bactericidal agent extracted from a soil bacillus. I. Preparation of the agent. Its activity in vitro, J. Exp. Med. 70, 1 (1939). J. C. Hoogerheide, Studies on capsule formation. III. Inhibition of capsule formation of *Klebsiella pneumoniae* (Friedlander's Bacterium) by an agent, produced by a soil bacillus, J. Bact. 40, 415 (1940).

It is an alcohol-soluble, water-insoluble material. On treating crude tyrothricin with solvents in order to purify it, it was found to separate into fractions of different solubilities among which are two crystalline polypeptides. They are known as Gramicidin and Tyrocidine. The latter is crystalline in the form of its HCl salt.

In animal tests and in vitro with added serum albumin gramicidin has been found to be approximately 100 times more active than tyrocidine hydrochloride. Serum albumin and similar protein materials such as blood, serum, plasma and related body fluids, inhibit the action of tyrocidine hydrochloride but enhance the action of gramicidin. These body fluids are invariably present in the clinical application of tyrothricin. Thus, most of the in vivo activity of gramicidin-tyrocidine hydrochloride mixtures and of tyrothricin is due to gramicidin, and as has been stated by Dubos and Porter, the antibacterial activity of tyrothricin is essentially a measure of its gramicidin content.

"Generally speaking, all three agents are more active against Gram-positive organisms than Gram-negative ones. Tyrocidine has some activity against Gram-negative organisms while gramicidin is primarily bacteriostatic." R. D. Hotchkiss, Monograph on Advances in Enzymology and Related Subjects of Biochemistry, 1944, page 172.

It has been pointed out that the composition and activity of different preparations of tyrothricin is remarkably constant, but that it has been difficult "to isolate a high yield of crystalline gramicidin from some recent commercial preparations. There is reason to believe that tyrothricin normally contains from 10 to 20% gramicidin and 40 to 60% tyrocidine hydrochloride, of which perhaps two-thirds can ordinarily be obtained in crystalline form." Hotchkiss, cited above, page 159.

Various methods of separating tyrothricin into gramicidin and tyrocidine hydrochloride have been described. To my knowledge, none of them are in commercial use, nor are they adaptable to commercial use, and gramicidin is not yet available in commercial quantities.

Methods of fractionation have been described by Hotchkiss, cited above, page 158; Hoogerheide, Antibiotic substances produced by soil bacteria, Botan. Rev. 10, 599 (1944); and by Tishler, U. S. P. 2,365,499. These methods extract gramicidin from solid tyrothricin using acetone and ether as solvents. However, these solvents are highly inflammable and explosive, their use in large-scale operation is generally avoided. When employing both acetone and ether in the process, many hours of extraction under reflux are needed to complete the operation, and at the end of this drastic treatment it was found that considerable decomposition had occurred which resulted in low yields. Ether alone gave little or no extraction after several days of operation.

In another known method described by Lewis and co-workers, Chemical Derivatives of Gramicidin, Proc. Soc. Expt. Biol. Med., 1946, 63, 302-308, footnote page 304, tyrothricin is dissolved in alcohol and tyrocidine precipitated from the solution with phosphotungstic acid. The precipitate consisting of tyrocidine phosphotungstate is separated from the dissolved gramicidin. Tyrocidine phosphotungstate is appreciably soluble in alcohol, and the authors admit that their gramicidin will contain 5% of tyrocidine but they make no suggestion for its removal. The method is laborious in large-scale operation as it involves bulky precipitates which are hard to filter. Tungsten is introduced into the mass as a foreign element, and the removal of traces of it from the final products involves prolonged washing.

The problem therefore still remained of developing a fractionating procedure which is practical and at the same time gives the best possible results.

I have discovered that tyrothricin can be fractionated into its aforementioned major components simply, more completely, and extremely rapidly by mixing it with a solvent system comprising water, a water-soluble oil-soluble solvent, and a water-insoluble oil-soluble solvent, care being taken that the system is substantially heterogeneous, and isolating the components of tyrothricin from the phases.

The method has the advantage of great convenience in large-scale operation. It merely requires the mixing of the ingredients by mechanical or other suitable means, and it can be operated at room temperature. Moreover, fractionation is extremely rapid since it occurs entirely in solution within the solvent system.

The following examples demonstrate my invention. They show that the new process can be applied to and will work effectively on tyrothricin in any stage of purification from the original fermented culture liquor to the final pure finished product.

Example I 900 ml. of tyrothricin fermentation liquor were fractionated as follows:

100 ml. benzene and 100 ml. absolute alcohol were added to the liquor, thoroughly mixed, the mixture was centrifuged, and the clear benzene layer separated.

The benzene fraction was evaporated in vacuo to an oily mass to which 15 ml. of pentane were added. The precipitate was filtered and dissolved in 4 ml. of hot absolute acetone. The solution was concentrated to 2 ml. and left in the refrigerator overnight. The crystallized precipitate was then filtered. The final product was identified as crystalline gramicidin by the characteristic lenticular crystal structure observed under the microscope, as shown on page 161 of the aforementioned monograph by R. D. Hotchkiss.

No yield of gramicidin can be given in this instance due to the small amount of gramicidin initially present in the fermented liquor. The liquor was estimated to contain approximately 1 g. of tyrothricin per gallon. Consequently the 900 ml. of liquor used here would yield not more than 0.25 g. of tyrothricin which in turn would contain not more than 80 mg. of gramicidin. The identification of such a small amount of gramicidin in 900 ml. of liquid, equivalent to a 0.009% solution of gramicidin, by means of my new process, indicates a high efficiency of separation.

Example II 5 lbs. of acid precipitated solid (Hotchkiss, Advances in Enzymology, pages 157-8) from 30 gallons of tyrothricin fermentation liquor containing about 40 g. (2%) of tyrothricin were extracted with 12 liters of absolute ethyl alcohol and filtered. The filtrate was evaporated in vacuo to 1 liter, and the concentrate extracted twice with 1 liter of pentane. The pentane layers were discarded.

40 g. of decolorizing charcoal were added to the pentane-extracted filtrate and filtered off.

To 500 ml. of the charcoal-treated filtrate were added 200 ml. benzene and 300 ml. water, the whole shaken thoroughly, centrifuged, and the benzene layer separated. This treatment of the charcoal-treated filtrate was repeated twice, all benzene fractions were combined and evaporated in vacuo.

200 ml. of absolute acetone were added to the residue and concentrated by boiling to 150 ml. The concentrate was refrigerated overnight. The crystals which had formed in the concentrate were filtered off, and the mother liquor concentrated first to 50 ml. and then to 25 ml., the two concentrates refrigerated overnight, and the formed crystals filtered off. Total yield of crystalline gramicidin was 3.85 g.=19.2% of estimated tyrothricin in the initial material.

The combined crystal crops were redissolved in 50 ml. absolute acetone, and the solution refrigerated overnight. After filtering, the formed crystals were dried in vacuo. The total yield of crystalline gramicidin thus obtained was 2.5 g.

These gramicidin crystals seen under the microscope had a lenticular structure identical with that of the gramicidin crystals shown by Hotchkiss on page 161 of his aforementioned monograph. The physical properties of this product were as follows when compared with those shown in Table I, page 159, of the Hotchkiss monograph:

M. P. 228° C. (Hotchkiss: 228-30° C.). Optical rotation in absolute alcohol $[\alpha]_D = +6.2$ (Hotchkiss: +5). Absorption maxima, A: 2810, 2910, 2690; extinction coefficient: 118 (Hotchkiss: 125).

Example III

Example II was repeated with 5 lbs. of acid precipitated solid from tyrothricin fermentation liquor. The total yield of gramicidin, as the residue remaining after evaporation of the benzene, was 13.6 g. of an amorphous material or 33% of estimated tyrothricin in the initial material.

It will be seen that the fractionation technique described in Examples II and III yields up to 33% of amorphous gramicidin of which 50 to 60% or approximately 19% of the original tyrothricin were crystallized. These figures compare favorably with Hotchkiss' aforequoted statement that tyrothricin contains from 10 to 20% of gramicidin "of which perhaps two-thirds can ordinarily be obtained in crystalline form."

Example IV 40 ml. of the charcoal-treated filtrate used in Example II were fractionated by adding 10 ml. absolute ethyl alcohol, 16 ml. benzene, and 14 ml. water. The mixture was thoroughly shaken, centrifuged, and the benzene layer separated. This process was repeated twice, and the combined benzene fractions distilled to dryness in vacuo.

The residue was dissolved in 10 ml. absolute ethyl alcohol, and the alcohol was added to 100 ml. 1% NaCl solution. The precipitate was filtered off and dried in vacuo. The yield was 0.47 g. of amorphous gramicidin.

*Example V*

5.0 g. of tyrothricin were fractionated by dissolving it in 130 ml. absolute ethyl alcohol, adding 52 ml. benzene, and shaking the whole thoroughly. Thereafter 98 ml. of water were added, the whole again shaken and centrifuged. The benzene layer was separated, and the aqueous layer treated twice more with 26 ml. of benzene as above.

(a) The combined benzene fractions were evaporated to dryness, and the residue dissolved in 20 ml. of hot acetone. The solution was refrigerated overnight, and the crystalline precipitate of gramicidin filtered off. The mother liquor was concentrated to 10 ml., refrigerated as above, and another crop of gramicidin crystals filtered off. The second mother liquor was added to 1% NaCl solution, and an amorphous precipitate of gramicidin filtered off. All precipitates were dried over $P_2O_5$ in vacuo.

(b) The alcohol-water phase left after removal of the benzene layer as described under (a) was added to 10 volumes of 1% NaCl solution. The precipitate was filtered off and dried over $P_2O_5$ in vacuo. It was then extracted with 180 ml. of hot absolute alcohol, the extract cooled, and an equal volume of alcoholic HCl added, and the whole refrigerated overnight. The crystalline precipitate (tyrocidine hydrochloride) was filtered off.

The residue from the alcoholic extraction of the above precipitate was extracted with 100 ml. hot absolute ethyl alcohol (a small insoluble residue was discarded) and treated with alcoholic HCl as described above whereby another crop of crystalline tyrocidine hydrochloride was obtained.

All mother liquors were added to 10 volumes of 1% NaCl solution. The amorphous precipitate was filtered off, and all precipitates were dried over $P_2O_5$ in vacuo.

(1) The gramicidin crystals produced by the fractionation were identified as such by microscopic appearance, melting point, optical notation, and absorption spectrogram, as in Example II, these data being in substantial agreement with the data published by Hotchkiss quoted above as characteristic of crystalline gramicidin.

(2) The crystals of tyrocidine hydrochloride were identified as follows: Crystal structure fine needles identical with those shown by Hotchkiss, Advances in Enzymology, page 161. Absorption spectrum similar to that of gramicidin which is in agreement with the statement of Hotchkiss and Dubos, J. Biol. Chem. 141, 159 (1941) that the absorption curve of tyrocidine hydrochloride is of the same general type as that of gramicidin.

(3) The yields obtained were:

|  | Grams | Per cent of tyrothricin |
| --- | --- | --- |
| Gramicidin: |  |  |
| crystalline | 0.26 |  |
| amorphous | 0.75 |  |
| Total | 1.01 | 20 |
| Tyrocidine HCl: |  |  |
| crystalline | 1.35 |  |
| amorphous | 1.05 |  |
| Total | 2.40 | 48 |

As no attempt was made to crystallize the gramicidin solution exhaustively, the percentage yield of crystalline gramicidin in this example is low.

*Example VI*

24.2 g. of tyrothricin were fractionated by suspending the material in 250 ml. absolute ethyl alcohol and adding 50 ml. of water. The tyrothricin dissolved readily. After filtering off from debris, 50 ml. benzene were added giving a clear solution.

100 ml. water were slowly added to the solution and the liquid centrifuged. The benzene layer was separated, and 100 ml. benzene added twice more to the solution, shaken and separated by centrifuging. The combined benzene fractions were evaporated to dryness in vacuo. The ethyl alcohol-water layer was added to 4 liters of 1% NaCl solution, the precipitate filtered and dried over $P_2O_5$ in vacuo.

|  | Yield, Gms. | Per cent of tyrothricin |
| --- | --- | --- |
| Gramicidin | 8.0 | 33 |
| Tyrocidine HCl | 14.5 | 64 |

These yields of gramicidin and tyrocidine hydrochloride are higher than the percentages of these two components in tyrothricin reported by Hotchkiss which were 10–20% for gramicidin and 40–60% for tyrocidine hydrochloride (Advances in Enzymology, page 159).

*Example VII*

10.0 g. of tyrothricin were fractionated by dissolving the material in 200 ml. absolute alcohol, 80 ml. benzene and 120 ml. water were added, the whole shaken thoroughly, and centrifuged.

The benzene layer was separated, and the remaining aqueous layer shaken twice more with 80 ml. of benzene, and the combined benzene fractions evaporated to dryness in vacuo.

The yield was 2.3 g. of amorphous gramicidin.

For the purpose of comparing the results of my process with those of the known methods I have fractionated samples of tyrothricin by each of the known procedures and by my new method. The aforementioned methods of Hotchkiss, Hoogerheide, Tishler, and Lewis and co-workers were used and the results compared with those obtained when using the present method. I have found, in each instance, that the results produced by the method described and claimed here are far superior to those obtained by the methods of the prior art, as is evidenced by the following examples.

*Example VIII*

5.0 g. of tyrothricin were fractionated by the Hoogerheide method quoted above.

The material was refluxed in 100 ml. of absolute acetone for 4 hours, leaving an undissolved residue of 3.7 g. after filtering off the hot solution. This solution was cooled, mixed with an equal volume of ether, and filtered. The filtrate was evaporated to 20 ml. in vacuo, and refrigerated overnight. A small amount of sediment appeared the next day, but gramicidin crystals microscopically identical with those shown on page 161 of the aforequoted monograph by R. D. Hotchkiss were not apparent until after three days of refrigeration.

The yield of gramicidin was too small to be accurately weighed.

Example IX 5.0 of tyrothricin were fractionated by the Hotchkiss method quoted above.

The material was extracted thoroughly by several hours' mechanical shaking with 100 ml. of 50:50 acetone-ether. The extract was filtered, the filtrate evaporated down to 10 ml., and refrigerated overnight. The amount of amorphous material which appeared was too small to be accurately weighed.

Example X 5.0 g. of tyrothricin were fractionated by the aforequoted Tishler method.

The material was refluxed and extracted with 100 ml. absolute ether for 6 hours, filtered, and the ether evaporated off in vacuo. The total solids extracted by the absolute ether represented less than 1% of the weight of the starting material and consisted of a brownish gummy film. It was impossible to detect gramicidin crystals.

Example XI 5.0 g. of tyrothricin were fractionated by the method of Lewis and co-workers quoted above.

The material was dissolved in 64 ml. absolute alcohol, and 8.5 ml. of 60% phosphotungstic acid in absolute alcohol was added. The precipitate was filtered and washed, and to the filtrate and washings were added 400 ml. of 1% NaCl solution. The precipitate thus obtained was filtered off, washed, and suspended in 200 ml. water, NaOH solution was added to bring it to pH 10.0, and it was allowed to stand overnight. The precipitate was filtered off and washed thoroughly with 1% NaCl solution. It was then extracted with 100 ml. acetone and the extract filtered. The filtrate after evaporation in vacuo to 10 ml. was refrigerated overnight.

No gramicidin crystals appeared. The amorphous residue weighed 0.915 g.

It will be apparent from the above examples that my new fractionating process separates gramicidin and tyrocidine from tyrothricin in a manner which is more convenient and economical and gives the pure major components in excellent yields.

The examples show that the solvent system comprising water, a water-soluble oil-soluble solvent, and water-insoluble oil-soluble solvent is highly effective in partitioning tyrothricin. It makes possible the rapid qualitative detection of even the smallest traces of gramicidin in crude tyrothricin (Example I).

The examples also demonstrate that partitioning is accomplished by bringing tyrothricin in contact with the solvents in any suitable sequence, and if desired in suitably fractionalized application of the total quantities, of the solvents which constitute the substantially heterogeneous system and allow it to separate, after mixing, into the phases containing the separated major constituents.

Instead of ethyl alcohol I have used successfully other water-soluble oil-soluble solvents such as methyl alcohol dioxane, and glacial acetic acid. Water-insoluble, oil-soluble solvents other than benzene, such as pentane, cyclohexane, toluene, carbontetrachloride, amylacetate, isopropylether and tetradecanol are operative, although benzene is the most satisfactory solvent.

It is known that in a tyrothricin containing 20% gramicidin and 80% tyrocidine, the latter will contribute only about 3% of the antibacterial activity in an albuminous medium or in vivo. Thus, tyrocidine supplements the antibacterial action of gramicidin, but it does so only to a negligible degree. There is, however, evidence that while both gramicidin and tyrocidine are to a certain extent toxic and hemolytic, tyrocidine is more active in these respects than gramicidin. A gramicidin free from substantial amounts of tyrocidine which can readily be obtained by my new fractionation method, will be a useful contribution to the medical art, as it constitutes a therapeutically superior product, and a substantially pure tyrocidine will likewise be readily available for further research and clinical investigations.

What I claim is:

1. A process of fractionating tyrothricin which comprises mixing ethylalcohol, benzene, and an aqueous fermented culture liquor of tyrothricin to form a heterogeneous solution, separating the benzene layer, evaporating it to an oily mass, treating the mass with pentane, filtering off the pentane, dissolving the mass in acetone and concentrating the acetonic solution whereby gramicidin crystallizes from it.

2. A process of fractionating tyrothricin which comprises dissolving tyrothricin in a solvent system comprising substantial amounts each of water, a lower aliphatic alcohol and a lower aromatic hydrocarbon of the benzene series to form a heterogeneous system, separating the hydrocarbon layer and evaporating it whereby gramicidin is obtained.

3. A process in accordance with claim 2 in which the alcohol is ethanol.

4. A process in accordance with claim 2 in which the alcohol is methanol.

5. A process in accordance with claim 2 in which the aromatic hydrocarbon is benzene.

6. A process in accordance with claim 2 in which the solvents other than water are ethanol and benzene.

7. A process of fractionating tyrothricin which comprises dissolving it in absolute ethanol, adding benzene, shaking the whole thoroughly, adding water, each solvent being present in the mixture in an amount which is sufficient relative to the other solvents to form a heterogeneous system, shaking it thoroughly, centrifuging, separating the benzene layer from the aqueous layer, and evaporating the benzene layer to dryness whereby amorphous gramicidin is obtained.

8. A process of fractionating tyrothricin which comprises dissolving it in absolute ethanol, adding benzene, shaking the whole thoroughly, adding water, each solvent being present in the mixture in an amount which is sufficient relative to the other solvents to form a heterogeneous system, shaking it thoroughly, centrifuging, separating the benzene layer from the aqueous layer, and adding an inorganic salt to the latter to salt out the tyrocidine, and filtering off the tyrocidine.

9. A process of fractionating tyrothricin which comprises dissolving an acid precipitated solid from tyrothricin fermentation liquor in ethanol, adding charcoal to the solution, filtering it and adding benzene and water to the filtrate, each solvent being present in the mixture in an amount which is sufficient relative to the other solvents to form a heterogeneous system, centrifuging the mixture, separating the benzene layer and evaporating the benzene whereby amorphous gramicidin is obtained.

10. A process of fractionating tyrothricin which comprises dissolving an acid precipitated solid from tyrothricin fermentation liquor in ethanol, filtering the ethylalcoholic solution, evaporating the filtrate, concentrating it, and extracting it with pentane, treating the alcohol layer after pentane extraction with decolorizing charcoal, filtering it, adding benzene and water to the filtrate, each solvent being present in the mixture in an amount which is sufficient relative to the other solvents to form a heterogeneous system, centrifuging the mixture, separating the benzene layer and evaporating the benzene whereby amorphous gramicidin is obtained.

ABRAHAM L. BARON.

REFERENCES CITED

The following references are of record in the file of this patent:

Jordan, "Technology of Solvents" (Leonard Hill Ltd., London, 1937), pages 223–225, 236, 237, 240, 241, and 273.

Hotchkiss et al., J. Biol. Chem., vol. 141, pp. 155–162 (1941).

Dubos, J. Pediatrics, vol. 19, pp. 588–595 (1941).